(12) United States Patent  
Zhang et al.

(10) Patent No.: US 11,454,483 B2  
(45) Date of Patent: Sep. 27, 2022

(54) INTELLIGENT EXPLOSION-PROOF TABLE

(71) Applicants: Nuctech Company Limited, Beijing (CN); TSINGHUA UNIVERSITY, Beijing (CN)

(72) Inventors: Li Zhang, Beijing (CN); Gang Peng, Beijing (CN); Qingping Huang, Beijing (CN); Jianqing Dou, Beijing (CN); Yandi Wang, Beijing (CN); Kun Yang, Beijing (CN)

(73) Assignees: NUCTECH COMPANY LIMITED, Beijing (CN); TSINGHUA UNIVERSITY, Beijing (CN)

( * ) Notice: Subject to any disclaimer, the term of this patent is extended or adjusted under 35 U.S.C. 154(b) by 961 days.

(21) Appl. No.: 16/214,677

(22) Filed: Dec. 10, 2018

(65) Prior Publication Data

US 2020/0025545 A1    Jan. 23, 2020

(30) Foreign Application Priority Data

Dec. 11, 2017    (CN) ............................. 201711306999

(51) Int. Cl.
*F42D 5/04*    (2006.01)
*G06Q 50/26*    (2012.01)
*B64F 1/36*    (2017.01)

(52) U.S. Cl.
CPC ............. *F42D 5/04* (2013.01); *G06Q 50/265* (2013.01); *B64F 1/366* (2013.01)

(58) Field of Classification Search
CPC ......... F42D 5/04; G06Q 50/265; B64F 1/366; F42B 3/06
See application file for complete search history.

(56) References Cited

U.S. PATENT DOCUMENTS 4,632,041 A    12/1986    Ohlson
5,668,342 A *    9/1997    Discher .................... F42D 5/04
102/293

(Continued)

FOREIGN PATENT DOCUMENTS

CN    103353263 A    10/2013
EP    0 315 616 A1    5/1989

(Continued)

OTHER PUBLICATIONS

Russian Office Action and Search Report dated Sep. 4, 2019 received in Russian Application No. 2018143869/08(073150), together with an English-language translation.

(Continued)

*Primary Examiner* — Joshua E Freeman
(74) *Attorney, Agent, or Firm* — Scully Scott Murphy & Presser

(57) ABSTRACT

The present disclosure provides an intelligent explosion-proof table, including a worktable, an explosion-proof box; the worktable has a window passing through in the vertical direction. The explosion-proof box with an open top is arranged under the window of the worktable. A lifting plate which can be moved up and down and a support mechanism for driving the lifting plate to be lifted are provided inside the explosion-proof box. The lifting plate is used for placing a danger source and matches with the window and is capable of being raised into the window.

20 Claims, 2 Drawing Sheets

(56) References Cited

U.S. PATENT DOCUMENTS

| | | | | |
|---|---|---|---|---|
| 6,244,155 B1* | 6/2001 | Sparks | ............... | F42D 5/04 |
| | | | | 102/303 |
| 7,358,733 B2* | 4/2008 | Clark | ............... | G01V 5/0008 |
| | | | | 324/318 |
| 7,966,919 B2* | 6/2011 | Kolodkin | ............... | F42D 5/045 |
| | | | | 86/50 |
| 2004/0194614 A1* | 10/2004 | Wang | ............... | F42B 39/14 |
| | | | | 86/50 |
| 2016/0128495 A1* | 5/2016 | Looze | ............... | A47F 10/02 |
| | | | | 312/270.3 |
| 2019/0323809 A1* | 10/2019 | Keller | ............... | B65B 63/08 |

FOREIGN PATENT DOCUMENTS

| | | | |
|---|---|---|---|
| GB | 2488347 A | 8/2012 |
| JP | 2006-163788 A | 6/2006 |
| JP | 2014-530340 A | 11/2014 |
| RU | 2 582 133 C1 | 4/2016 |
| UA | 58196 U | 4/2011 |
| WO | 92/18960 A1 | 10/1992 |
| WO | 2014/106566 A1 | 7/2014 |

OTHER PUBLICATIONS

European Extended Search Report dated Mar. 13, 2019 received in European Application No. 18 21 1530.3.

\* cited by examiner

INTELLIGENT EXPLOSION-PROOF TABLE

CROSS-REFERENCE TO RELATED APPLICATIONS

The present application is based on and claims priority to the Chinese Application No. 201711306999.2, filed on Dec. 11, 2017, the entire contents of which is hereby incorporated by reference.

TECHNICAL FIELD

The present disclosure relates to an apparatus for performing security inspection in public places, which relates to an intelligent explosion-proof table.

BACKGROUND

In public places such as airports, customs, platforms and terminals, in order to prevent and stop occurrence of explosions, shootings, terrorist attacks, etc., it is necessary to inspect, transfer and anti-explode dangerous goods. If a baggage of the passenger is checked by X-ray machine or other security equipment and then marked as a suspicious baggage, it is often necessary to open the baggage. When the baggage is found to be a high-risk baggage during opening, the suspicious baggage needs to be placed into an explosion-proof box, and then transferred to the dangerous goods treatment area. In the actual application, the current explosion-proof box has no systematic and integrated operation platform and no information processing platform, so that the information such as a danger source and its owner's identity cannot be compared and determined online; otherwise, the danger source cannot quickly enter the explosion-proof box and the explosion-proof box is small in size and cannot handle a package with larger volume; it not only increases the operation time, but also increases risk factors.

It should be noted that the information disclosed in the background section above is only intended to enhance understanding of the background of the present disclosure, and thus may include information that does not constitute related art known to those of ordinary skill in the art.

SUMMARY

According to an aspect of the present disclosure, an intelligent explosion-proof table is provided, including a worktable and an explosion-proof box with an open top. The worktable has a window passing through in the vertical direction. The explosion-proof box is disposed under the window, and a lifting plate which can be moved up and down and a support mechanism for driving the lifting plate to be lifted are provided inside the explosion-proof box. The lifting plate is used for placing a danger source, and the lifting plate matches with the window and is capable of being raised into the window.

According to an embodiment of the present disclosure, a computer processing system, a danger source identification device, and a display device are further included. The danger source identification device is electrically connected to the computer processing system for identifying an electronic identity information of a danger source and transmitting the electronic identity information of the danger source to the computer processing system. The display device is disposed on the worktable and electrically connected to the computer processing system to display information of a scanned image of the danger source. The computer processing system retrieves the scanned image of the danger source through the electronic identity information of the danger source to display the scanned image on the display device.

According to an embodiment of the present disclosure, the explosion-proof box further includes an explosion-proof blanket for covering the danger source on the lifting plate after the lifting plate is lowered.

According to an embodiment of the present disclosure, an audio and video recording device is further included for collecting evidence of a site of security inspection.

According to an embodiment of the present disclosure, an image storage system is further included for storing evidence collected by the audio and video recording device.

According to an embodiment of the present disclosure, an identity document scanner is further included for identifying identity information of an owner of the danger source and transmitting the identity information to the computer processing system.

According to an embodiment of the present disclosure, the explosion-proof box is a box body with an open steel structure which is resistant to TNT explosives, and a lower part of the box body is provided with rolling casters.

According to an embodiment of the present disclosure, a positioning device for fixing the explosion-proof box to the worktable is provided between the explosion-proof box and the worktable.

According to an embodiment of the present disclosure, the rolling caster is a wheel body half-embedded in a load-bearing steel structure.

According to an embodiment of the present disclosure, the support mechanism includes two sets of scissor devices respectively located at two sides of the lower portion of the lifting plate and a power push rod for driving the lifting plate.

According to an embodiment of the present disclosure, a first sliding track is provided at a bottom of the lifting plate, and a second sliding track is provided on a bottom plate of the explosion-proof box.

According to an embodiment of the present disclosure, each scissor device comprises a first scissor arm and a second scissor arm hinged to each other, one end of the first scissor arm being hinged on the bottom plate of the explosion-proof box and the other end being slidably connected to the first sliding track of the lifting plate, one end of the second scissor arm being hinged at a bottom of the lifting plate, and the other end is slidably connected to the second sliding track on the bottom plate of the explosion-proof box.

According to an embodiment of the present disclosure, a limit switch for limiting limit positions for raising and lowering of the lifting plate is provided on the second slide track on the bottom plate of the explosion-proof box.

According to an embodiment of the present disclosure, the audio and video recording device includes an audio and video recording head. The image storage system includes a hard disk recorder, the audio and video recording head is used for collecting evidence of a site of security inspection, and the hard disk recorder is used to store the evidence collected by the audio and video recording head.

According to an embodiment of the present disclosure, the explosion-proof box further includes an operation switch for manually controlling lifting movement of the lifting plate.

According to an embodiment of the present disclosure, the explosion-proof box is provided with a hook for pulling the explosion-proof box to move.

According to an embodiment of the present disclosure, the positioning device includes a positioning lock.

According to an embodiment of the present disclosure, the positioning lock is a mechanical lock.

According to an embodiment of the present disclosure, the danger source identification device is a handheld RFID reader.

According to an embodiment of the present disclosure, the identity document scanner is a scanner for scanning at least one of a passport, an identity card, or a boarding pass.

BRIEF DESCRIPTION OF THE DRAWINGS

The above and other features and advantages of the present embodiments will become more apparent from the detailed description of the exemplary embodiments.

DETAILED DESCRIPTION

Figure 1:
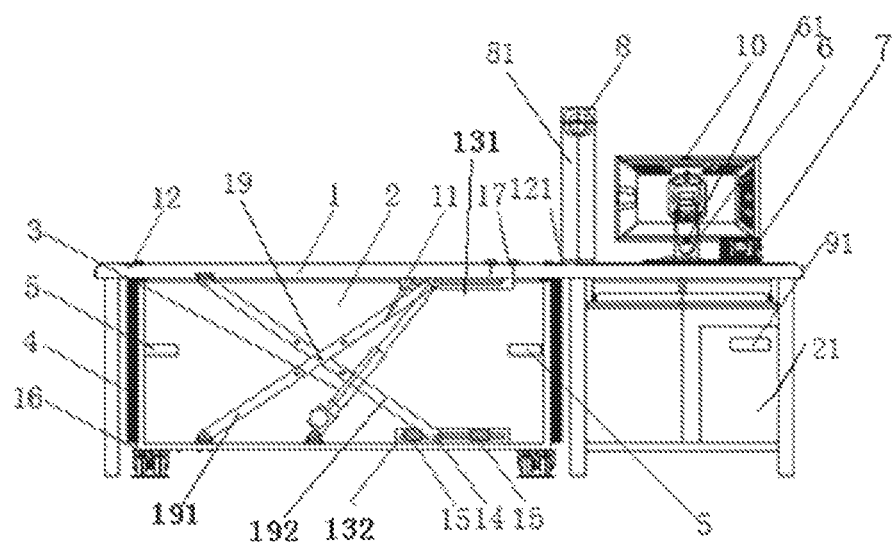
FIG. 1 is a schematic structural view of an intelligent explosion-proof table according to an embodiment of the present invention.

Example embodiments will now be described more fully with reference to the accompanying drawings. However, the example embodiments can be embodied in a variety of forms, and should not be construed as being limited to the embodiments set forth herein; rather, these embodiments are provided so that this disclosure will be thorough and complete, and the concepts of the example embodiments will be fully given to those skilled in the art. The same reference numerals in the drawings denote the same or similar structures, and thus their detailed descriptions will be omitted.

As shown in FIGS. 1 to 4, the embodiment discloses an intelligent explosion-proof table for performing security inspection in public places such as airports, customs, platforms, terminals and so on, and can be used for handling various danger sources such as a baggage or a handbag that may have explosive devices. The intelligent explosion-proof table includes a worktable 1, an explosion-proof box 2, a danger source identification device 61, an identity document scanner 7, a computer processing system 21, an image storage system 91, an audio and video recording device 81, and a display device 10. The explosion-proof table may also be combined with the image recognition technology of the luggage to obtain electronic information of the suspected luggage. In one embodiment, the danger source identification device 61 includes a handheld RFID (Radio Frequency Identification) reader 6, but is not limited thereto, and may transmit electronic identity information of the danger source to the computer processing system 21. Specifically, when the baggage or package is scanned by the X-ray inspection machine or the security inspection CT machine, if it is a suspected danger source, it is labeled with a barcode, and when the danger source is transported to the worktable, the handheld FRID reader 6 reads information of the barcode, obtains the electronic identity information of the danger source, and transmits the electronic identity information of the danger source to the computer processing system 21. A computer processing system 21 and an image storage system 91 may be installed at the lower portion of the worktable 1. The computer processing system 21 retrieves the scanned image of the danger source through the electronic identity information of the danger source to display the scanned image on the display device 10, and the image storage system 91 is used to store the evidence collected by the audio and video recording device 81.

A table of the worktable 1 is provided with a window 20 in vertical direction which is generally arranged in a rectangular shape. The explosion-proof box 2 is disposed below the window 20 of the worktable 1. The explosion-proof box 2 is a box body with an open top, in one embodiment, an open steel structure box body which is resistant to TNT explosives. Inside the explosion-proof box 2, there are provided a lifting plate 18 which may be moved up and down and a support mechanism for driving the lifting plate 18 to be lifted. The lifting plate is used to place a danger source. The lifting plate 18 is sized to match with the window 20 of the worktable 1. In use, the lifting plate 18 rises from the explosion-proof box 2 and enters the window 20. An upper surface of the lifting plate 18 is flush with the table of the worktable 1. In order to prevent the lifting plate from moving, the lifting plate may be locked by the positioning device 121.

The explosion-proof box 2 further includes an operation switch 17 for manually controlling the lifting operation of the lifting plate 18. The operation switch 17 is disposed on the table top of the worktable 1. When the staff thinks that the baggage to be unpacked for inspection is a high-risk explosive and needs to be put into the explosion-proof box 2, a lowering button on the operation switch 17 is pressed, and a support mechanism inside the explosion-proof box 2 starts to work to bring the lifting plate 18 to move downwards and automatically stop after the lower limit of the explosion-proof box 2 is reached. The movement of the lifting plate 18 of the explosion-proof box 2 may also be controlled by a wireless remote control. The operation switch 17 or the wireless remote control is electrically connected to the support mechanism, and can control the lifting movement of the support mechanism. The specific connection structure is the related known technology, which is not described here.

The explosion-proof box 2 also includes an explosion-proof blanket 4, which in one embodiment is a flexible explosion-proof blanket. When the lifting plate 18 is lowered to the lower limit position, the explosion-proof blanket 4 can cover the danger source on the lifting plate 18 to reduce the destructive force generated by an accidental explosion of the danger source. The explosion-proof blanket 4 may be disposed on the outer side wall of the explosion-proof box 2, and is pulled by an automatic traction device to cover a top opening of the explosion-proof box 2, or the explosion-proof blanket 4 is manually covered at the top opening of the explosion-proof box 2 to achieve the purpose of covering the danger source.

The handheld RFID reader 6 is used to identify the electronic identity information of the danger source, and the identity document scanner 7 is used to confirm the identity information of the owner of the danger source. The identity document scanner 7 is a scanner for scanning at least one of a passport, an identification (ID) card and a boarding pass, and is used to confirm the identity of the owner or to recognize the authenticity of documents and to send the acquired identity information to the computer processing system 21.

The audio and video recording device 81 is used for collecting and storing evidence of a site of security inspection, and may record audio and video materials for unpacking to inspect by staffs on site, which may include an audio and video recording head 8. The image storage system 91 includes a hard disk recorder 9 for collecting the evidence of a site of security inspection, and the hard disk recorder 9 is used for storing evidence collected by the audio and video recording head. The display device 10 is configured to display the security check result of the suspicious baggage. The display device 10 may be a display 10 or other device such as a tablet computer, and the displayed contents may include information such as an electronic identity information of the danger source read by the handheld RFID reader 6, information obtained by the identity document scanner 7 and the scanned image of the danger source. The computer processing system 21 retrieves the scanned image of the danger source from the electronic identity information of the danger source to display the scanned image on display device 10.

Figure 2:
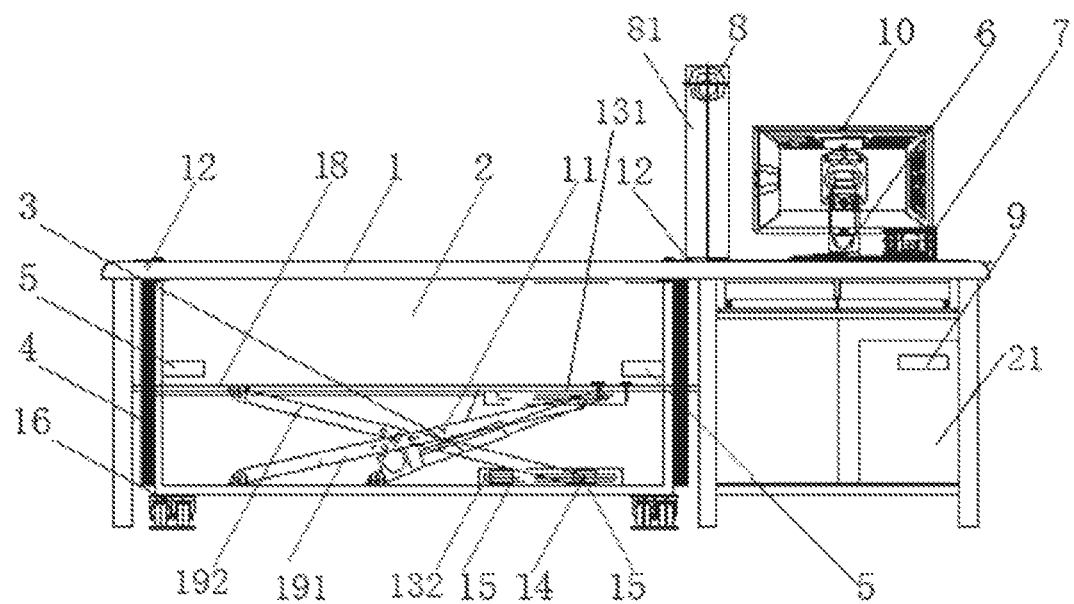
FIG. 2 is a schematic view of the lifting plate of FIG. 1 after being lowered.
Figure 3:
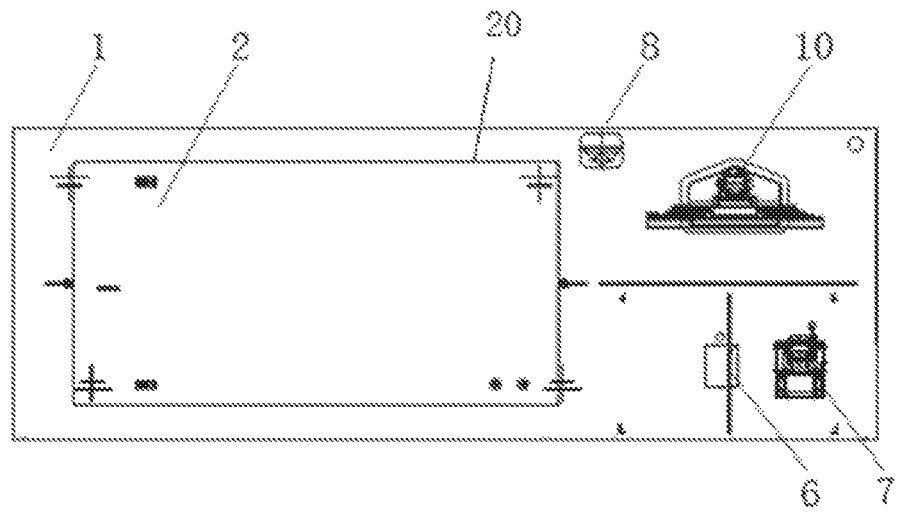
FIG. 3 is a top plan view of FIG. 1.
Figure 4:
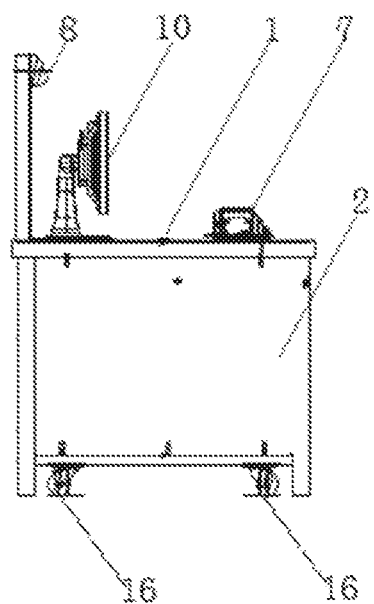
FIG. 4 is a schematic view of FIG. 1 as seen from another angle.

Referring to FIGS. 1 and 2, in the present embodiment, the support mechanism includes two sets of scissor devices 19 located at a lower portion of the lifting plate 18 and a power push rod 3 for driving the lifting plate 18 to move. The two sets of scissor devices 19 are located at front and rear sides of the lower portion of the lifting plate 18, and symmetrically disposed. The expression "front and rear" here refers to a relative position of the two sets of scissor devices 19. Specifically, as shown in FIG. 3, the display device 10 is located at front of the ID card scanner 7 and the handheld RFID reader.

As shown in FIG. 2, in the embodiment, a first sliding track 131 is provided at a bottom of the lifting plate 18, and a second sliding track 132 is provided on the bottom plate of the explosion-proof box 2. Specifically, two first sliding tracks 131 and two second sliding tracks 132 are provided to correspond to positions of the two sets of scissor devices 19.

The scissor device 19 includes a first scissor arm 191 and a second scissor arm 192 that are hinged to each other. The first scissor arm 191 and the second scissor arm 192 are cross-connected, wherein one end of the first scissor arm 191 is hinged on the bottom plate of the explosion-proof box 2, and the other end is slidably connected to the first sliding track 131 of the lifting plate 18 by a shaft pin 14. One end of the second scissor arm 192 is hinged at the bottom of the lifting plate 18, and the other end is slidably connected to the second sliding track 132 on the bottom plate of the explosion proof box 2 by another shaft pin 14.

A limit switch 15 for limiting limit positions for raising and lowering of the lifting plate 18 is mounted on the bottom plate of the explosion-proof box 2. The specific structure of the power push rod 3 is not limited, and may be an electric push rod, an electric cylinder, a hydraulic push rod or a pneumatic push rod, and may be a structure such as a smooth push rod or a spiral lead screw. The scissor device 19 may also be replaced by a device such as an oil cylinder and an air cylinder, as long as the device can bring the lifting plate 18 to be lifted.

The lower portion of the explosion-proof box 2 is provided with rolling casters 16, and a positioning lock 12 for fixing the explosion-proof box 2 and the worktable 1 is provided between the explosion-proof box 2 and the worktable 1. The positioning lock 12 may be an electronic lock capable of automatic control, and may also be a manually controlled mechanical lock. The rolling caster 16 is a wheel body half-embedded in a load-bearing steel structure. A hook 5 for pulling the explosion-proof box 2 to move is also provided on the explosion-proof box 2. The hook 5 may be manually pulled by a person or connected to a manipulator, and the manipulator automatically pulls the explosion-proof box 2 to move.

It can be seen from the above technical solutions that the advantages and positive effects of the present disclosure are as follows:

The intelligent explosion-proof table of the present disclosure is usually a worktable for unpacking inspection of suspicious packages. When the suspicious baggage arrives at the worktable, the display system automatically displays electronic photos and suspicious items of the suspicious package according to its electronic information. When the electronic display system displays the suspicious package as a high-risk explosive item, the security personnel presses the operation switch on the operation table, and then the lifting plate on the explosion-proof table be automatically lowered to the bottom of the explosion-proof box, so as to quickly hide the danger source into the explosion-proof box, and quickly cover with the explosion-proof blanket. Explosion-proof personnel can quickly connect the explosion-proof box and a moving mechanism through the hook on the explosion-proof box, and move the explosion-proof box and the danger source to the dangerous goods treatment area through the moving mechanism. The rolling casters at the lower part of the explosion-proof box can reduce friction between the explosion-proof box and the ground, and reduce vibration of the danger source. The audio and video recording device 81 may record the whole inspection process of the danger source, read the electronic identity information of the danger source through the handheld RFID reader and verify the identity of the owner with the identity document scanner to fast determine the owner of the dangerous goods, so as to effectively guarantee the personal safety of staffs and provide more comprehensive information support for staffs through a visual window of the display device 10.

The intelligent explosion-proof table of the present embodiment is used as follows:

First, the intelligent explosion-proof table is an unpacking table for daily inspection of suspicious baggage, and the danger source determined as a suspicious baggage after inspected by an X-ray machine or other security equipment is unpacked on the lifting plate 18 of the explosion-proof box 2. The baggage or package determined as a danger source after scanned by the X-ray machine is affixed with a barcode, and staffs scan the barcode through the handheld RFID reader 6 to read the electronic identity information of the danger source (or obtain the electronic information of the danger source through the image recognition technology for luggage) to retrieve the scanned image of the danger source through the computer processing system 21, to obtain the identity information of the owner of the danger source by using the identity document scanner 7, and to display information acquired by the handheld RFID reader 6 (or through the image recognition technology for luggage) and the identity document scanner 7 on the display 10 for comparison. The audio and video recording device 81 records the handling process of the danger source in real time.

Depending on the type of danger source, the staff may choose to unpack for inspection, process the danger source or identify the danger source as a high-risk explosive. When the danger source is identified as a high-risk explosive, the staff opens the positioning lock 12 to separate the lifting plate 18 of the explosion-proof box 2 from the worktable 1, and presses the lowering button of the operation switch 17, so that the support mechanism brings the lifting plate 18 to be lowered and the danger source will enter the explosion-proof box 2. The lifting plate 18 will automatically stop when the lower limit position is reached, and the explosion-proof blanket 4 covers on the top opening of the explosion-proof box 2. Finally, the staff connects the explosion-proof box and the power mechanism through the hook 5, and pulls the explosion-proof box 2 to the dangerous goods processing area through the power mechanism for treatment. After the treatment is completed, the explosion-proof box 2 is pushed to the lower portion of the worktable 1, the explosion-proof box 2 is positioned by the positioning device 121, and a raising button of the operation switch 17 is pressed to allow and the moving plate 18 in the explosion-proof box 2 start to rise. When the upper surface of the lifting plate 18 is flush with the upper surface of the worktable 1, the raising button of the operation switch 17 is released, and the lifting plate 18 and the table of the worktable 1 are locked by a locking device, so that the explosion-proof table may also be used as an unpacking table.

The intelligent explosion-proof table of the embodiment of the present disclosure can quickly put the danger source into the explosion-proof box 2, and record the whole inspection process of the danger source, verify and determine the identity of the owner through the handheld RFID reader (or through the luggage image recognition technology) and the identification document scanner, quickly lock the owner of the package, effectively guarantee the personal safety of the staff, and provide more comprehensive information support for the staff through the visual window of the display device 10.

The exemplary embodiments of the present disclosure have been specifically shown and described above. It should be understood that the present disclosure is not to be construed as being limited thereto. Instead, the present disclosure is intended to cover various modification and equivalent arrangement within the spirit and scope of the appended claims.

What is claimed is:

1. An intelligent explosion-proof table comprising:
    a worktable having a window passing through in the vertical direction;
    an explosion-proof box with an open top disposed under the window, and a lifting plate which can be moved up and down and a support mechanism for driving the lifting plate to be lifted being provided inside the explosion-proof box, the lifting plate being used for placing a danger source, and the lifting plate matching with the window and being capable of being raised into the window.

2. The intelligent explosion-proof table according to claim 1, further comprising:
    a computer processing system;
    a danger source identification device electrically connected to the computer processing system for identifying an electronic identity information of a danger source and transmitting the electronic identity information of the danger source to the computer processing system;
    a display device disposed on the worktable and electrically connected to the computer processing system to display information of a scanned image of the danger source;
    wherein the computer processing system retrieves the scanned image of the danger source through the electronic identity information of the danger source to display the scanned image on the display device.

3. The intelligent explosion-proof table according to claim 2, further comprising an identity document scanner for identifying identity information of an owner of the danger source and transmitting the identity information to the computer processing system.

4. The intelligent explosion-proof table according to claim 3, wherein the identity document scanner is a scanner for scanning at least one of a passport, an identification card and a boarding pass.

5. The intelligent explosion-proof table according to claim 2, wherein the danger source identification device comprises a handheld RFID reader.

6. The intelligent explosion-proof table according to claim 1, wherein the explosion-proof box further comprises an explosion-proof blanket for covering the danger source on the lifting plate after the lifting plate is lowered.

7. The intelligent explosion-proof table according to claim 1, further comprising an audio and video recording device for collecting evidence of a site of security inspection.

8. The intelligent explosion-proof table according to claim 7, further comprising an image storage system for storing evidence collected by the audio and video recording device.

9. The intelligent explosion-proof table according to claim 8, wherein the audio and video recording device comprises a audio and video recording head, the image storage system comprising a hard disk recorder, the audio and video recording head being used for collecting evidence of a site of security inspection, and the hard disk recorder being used to store the evidence collected by the audio and video recording head.

10. The intelligent explosion-proof table according to claim 1, wherein the explosion-proof box is a box body with an open steel structure which is resistant to TNT explosives, and a lower part of the box body is provided with rolling casters.

11. The intelligent explosion-proof table according to claim 10, wherein a positioning device for fixing the explosion-proof box to the worktable is provided between the explosion-proof box and the worktable.

12. The intelligent explosion-proof table according to claim 11, wherein the rolling caster is a wheel body half-embedded in a load-bearing steel structure.

13. The intelligent explosion proof platform according to claim 11, wherein the positioning device comprises a positioning lock.

14. The intelligent explosion-proof table according to claim 13, wherein the positioning lock is a mechanical lock.

15. The intelligent explosion-proof table according to claim 1, wherein the support mechanism comprises two sets of scissor devices respectively located at two sides of the lower portion of the lifting plate and a power push rod for driving the lifting plate.

16. The intelligent explosion-proof table according to claim 15, wherein a first sliding track is provided at a bottom of the lifting plate, and a second sliding track is provided on a bottom plate of the explosion-proof box.

17. The intelligent explosion-proof table according to claim 16, wherein each scissor device comprises a first scissor arm and a second scissor arm hinged to each other, one end of the first scissor arm being hinged on the bottom plate of the explosion-proof box and the other end being slidably connected to the first sliding track of the lifting plate, one end of the second scissor arm being hinged at a bottom of the lifting plate, and the other end is slidably connected to the second sliding track on the bottom plate of the explosion-proof box.

18. The intelligent explosion-proof table according to claim 17, wherein a limit switch for limiting limit positions for raising and lowering of the lifting plate is provided on the second slide track on the bottom plate of the explosion-proof box.

19. The intelligent explosion-proof table according to claim 1, wherein the explosion-proof box further comprises an operation switch for manually controlling lifting movement of the lifting plate.

20. The intelligent explosion-proof table according to claim 1, wherein the explosion-proof box is provided with a hook for pulling the explosion-proof box to move.

* * * * *